United States Patent
Robinson et al.

(10) Patent No.: US 10,481,635 B2
(45) Date of Patent: Nov. 19, 2019

(54) CONFIGURING A USER INTERFACE LAYOUT OF A USER DEVICE VIA A CONFIGURATION DEVICE

(71) Applicant: Verizon Patent and Licensing Inc., Arlington, VA (US)

(72) Inventors: Quentin N. Robinson, Willingboro, NJ (US); Graham D. Sysko, Cambridge, MA (US); Melissa Kark, Jersey City, NJ (US); Denise N. Lyn-Shue, Cambridge, MA (US); Horst Frankenberger, Rocky Hill, NJ (US); Martin Luther Bunyi, Long Valley, NJ (US); Layton R. Diament, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

(21) Appl. No.: 15/146,465

(22) Filed: May 4, 2016

(65) Prior Publication Data

US 2017/0322711 A1 Nov. 9, 2017

(51) Int. Cl.
| | | |
|---|---|---|
| G06F 3/00 | (2006.01) | |
| G06F 1/16 | (2006.01) | |
| G06F 3/0482 | (2013.01) | |
| G06F 3/0481 | (2013.01) | |
| G06F 9/451 | (2018.01) | |
| G04G 9/00 | (2006.01) | |
| G04G 21/00 | (2010.01) | |

(52) U.S. Cl.
CPC ............ G06F 1/163 (2013.01); G04G 9/0064 (2013.01); G06F 3/0482 (2013.01); G06F 3/04817 (2013.01); G06F 9/451 (2018.02); *G04G 21/00* (2013.01)

(58) Field of Classification Search
CPC ................................. G06F 3/1423; H04N 7/24
USPC ...................................................... 715/248, 762
See application file for complete search history.

(56) References Cited

U.S. PATENT DOCUMENTS

| 8,677,277 B2 | 3/2014 | Stallings et al. | |
|---|---|---|---|
| 2005/0114784 A1* | 5/2005 | Spring ............. | G06F 17/30056 715/762 |
| 2007/0162842 A1* | 7/2007 | Ambachtsheer ...... | G06F 17/211 715/205 |
| 2010/0146401 A1* | 6/2010 | Fubioka ................. | G06Q 30/02 715/747 |
| 2015/0061968 A1* | 3/2015 | Park ...................... | G06F 3/1423 345/2.1 |

(Continued)

OTHER PUBLICATIONS

How-To Geek, LLC, "How to Use iTunes to Quickly Organize Apps on iPhone and iPad," http://www.howtogeek.com/208682/how-to-use-itunes-to-quickly-organize-apps-on-iphone-and-ipad/, Feb. 5, 2015, 6 pages.

*Primary Examiner* — Andrey Belousov

(57) ABSTRACT

A device may provide information identifying a user interface layout, associated with a smart watch, for display. The device may receive a user configuration of the user interface layout based on providing the information identifying the user interface layout for display. The device may provide, to the smart watch, configuration information associated with the user configuration to permit the smart watch to update a user interface based on the configuration information.

20 Claims, 10 Drawing Sheets

(56) References Cited

U.S. PATENT DOCUMENTS

2015/0071458 A1* 3/2015 Sullivan .................. H04N 7/24
381/77

\* cited by examiner

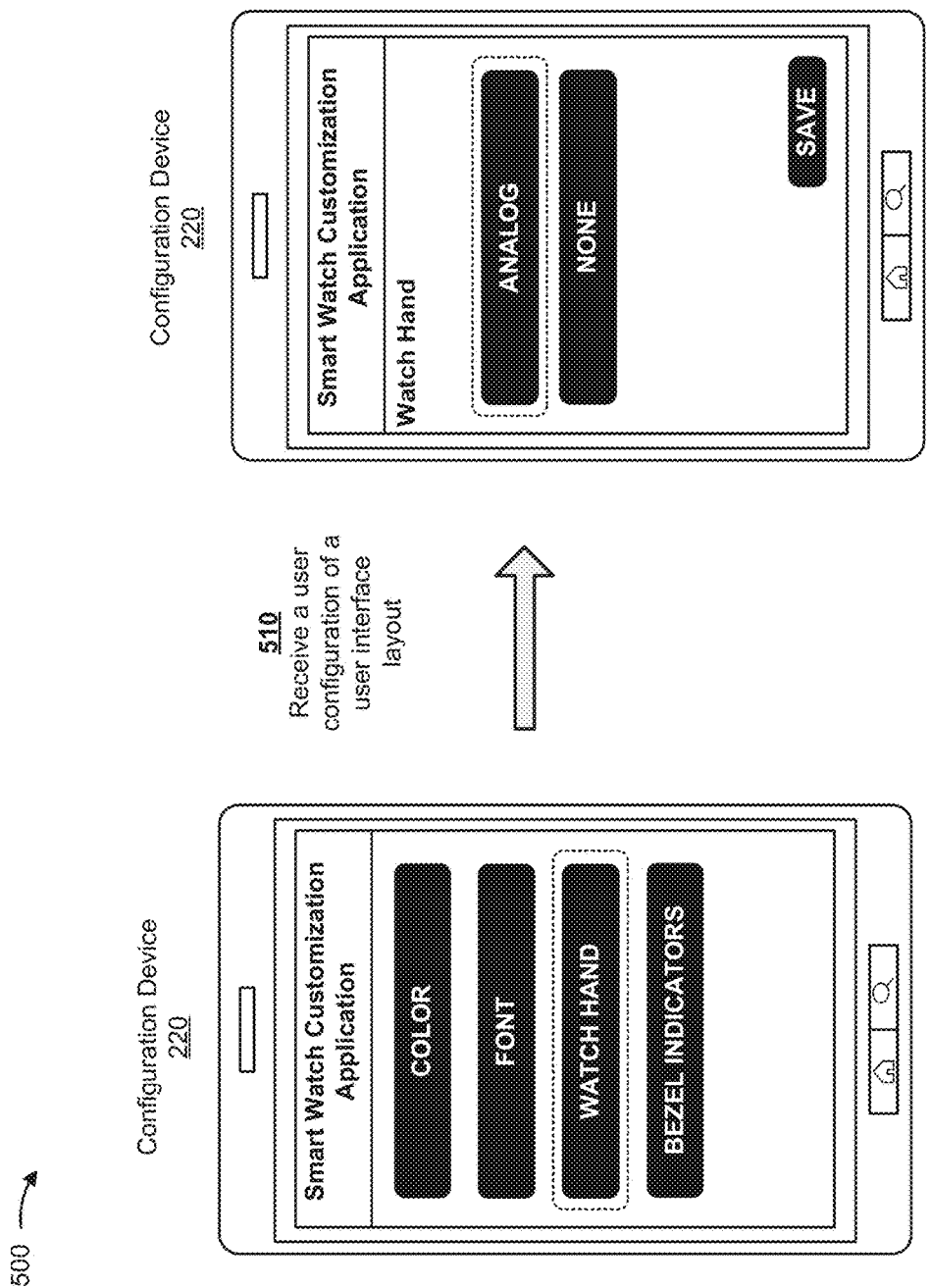

CONFIGURING A USER INTERFACE LAYOUT OF A USER DEVICE VIA A CONFIGURATION DEVICE

BACKGROUND

A user device, such as a smart watch, may include a graphical user interface that includes various user interface elements. For example, the user device may include user interface elements associated with a clock face, applications, or the like.

BRIEF DESCRIPTION OF THE DRAWINGS

FIGS. 5A-5C are diagrams of an example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A wearable user device, such as a smart watch, may include a display that may be used to display screen information (e.g., user interface elements and/or content) in association with a particular user interface layout. In some cases, the user device may display particular user interface elements, may display the particular user interface elements in a particular arrangement, may display the particular user interface elements in association with a particular characteristic (e.g., color and/or style), or the like, based on the user interface layout. If a user desires to modify the user interface layout, then the user may be required to download, via the user device, a file associated with a different user interface layout. However, the different user interface layout may display user interface elements in a pre-set manner (e.g., may not allow further configuration).

Implementations described herein may assist a user in configuring a user interface layout of a user device via a configuration device. Implementations described herein may enable a configuration device to receive a user configuration of a user interface layout and provide, to a user device, configuration information associated with the user configuration. In this way, the user device may receive the configuration information and may update a user interface based on the configuration information. Implementations described herein may enable a user device to modify a user interface layout without requiring that the user device download multiple files associated with different user interface layouts, thereby conserving processor and/or memory resources of the user device and/or conserving network resources. Additionally, implementations described herein may enable a configuration device and/or a server device to provide configuration information to multiple user devices, thereby obviating the need to independently configure a user interface layout on each user device and thereby conserving processor and/or memory resources of each user device.

While implementations will be described in terms of a user device in the form of a smart watch, these implementations are not limited to smart watches. In practice, these implementations may be used in conjunction with other types of user devices that include a user interface layout, such as a smart phone, a tablet device, and other handheld user devices.

Figure 1A:
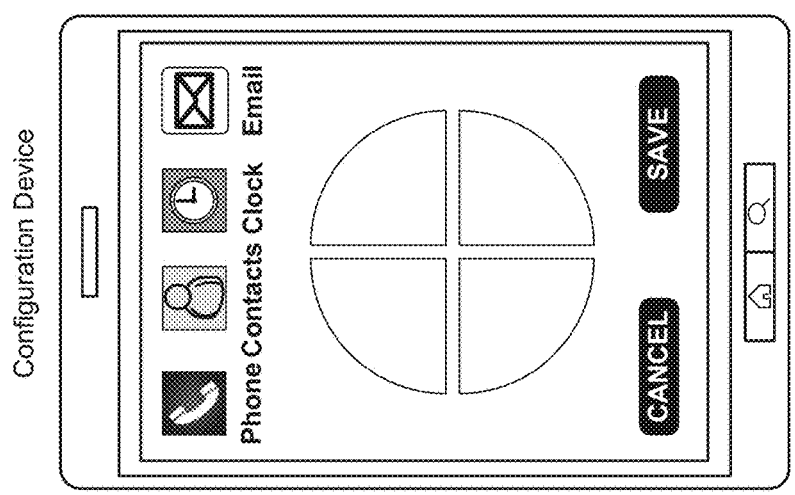
FIGS. 1A-1D are diagrams of an overview of an example implementation described herein.

FIGS. 1A-1D are diagrams of an overview of an example implementation 100 described herein. As shown in FIG. 1A, and by reference number 110, a configuration device (e.g., a mobile phone, a tablet computer, or a desktop computer) may provide information identifying a user interface layout, associated with a user device (e.g., a smart watch), for display. For example, the configuration device may execute an application that may enable the configuration device to configure a user interface layout of the user device. For example, assume that the user device includes a user interface that may display user interface elements (e.g., icons) in association with four quadrants of the user interface of the user device. As shown in FIG. 1A, the configuration device may provide a representation of the user interface layout (e.g., four quadrants) and may display user interface elements (e.g., icons associated with applications) that may be associated with the user interface layout.

Figure 1B:
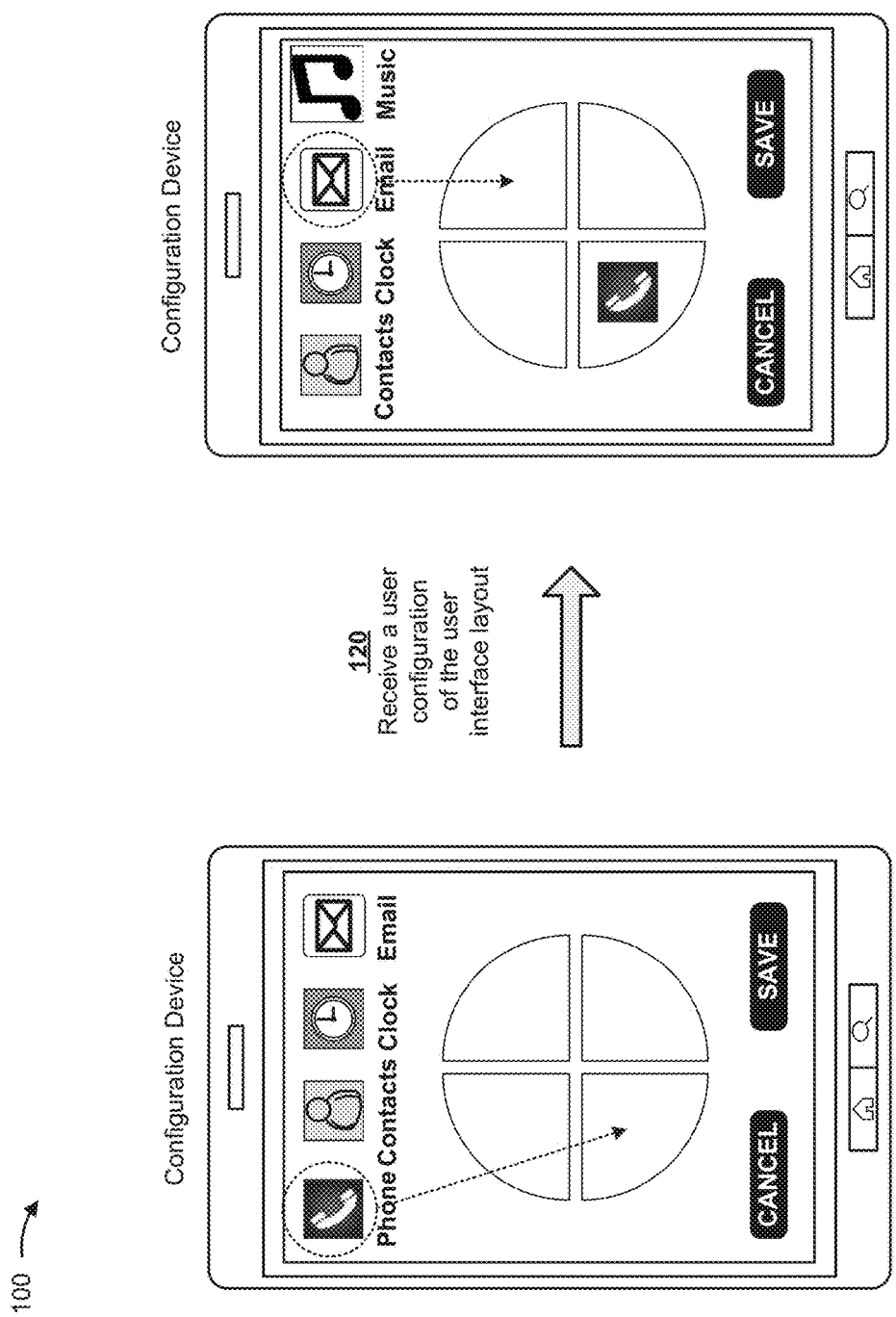

As shown in FIG. 1B, and by reference number 120, the configuration device may receive a user configuration of the user interface layout. For example, the configuration device may receive the user configuration based on a user interaction (e.g., a touch gesture) with the configuration device. For example, as shown, the user may drag particular user interface elements and may release the user interface elements in particular quadrants. For example, the user may drag and release a first user interface element (e.g., an icon associated with a phone application) in association with a first quadrant, and may drag and release a second user interface element (e.g., an icon associated with an email application) in association with a second quadrant.

Figure 1C:
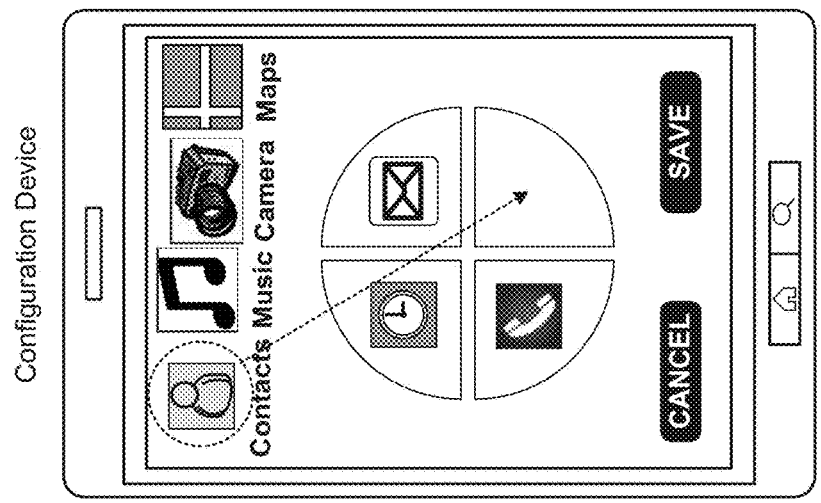
Figure 1C:
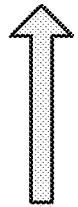
Figure 1C:
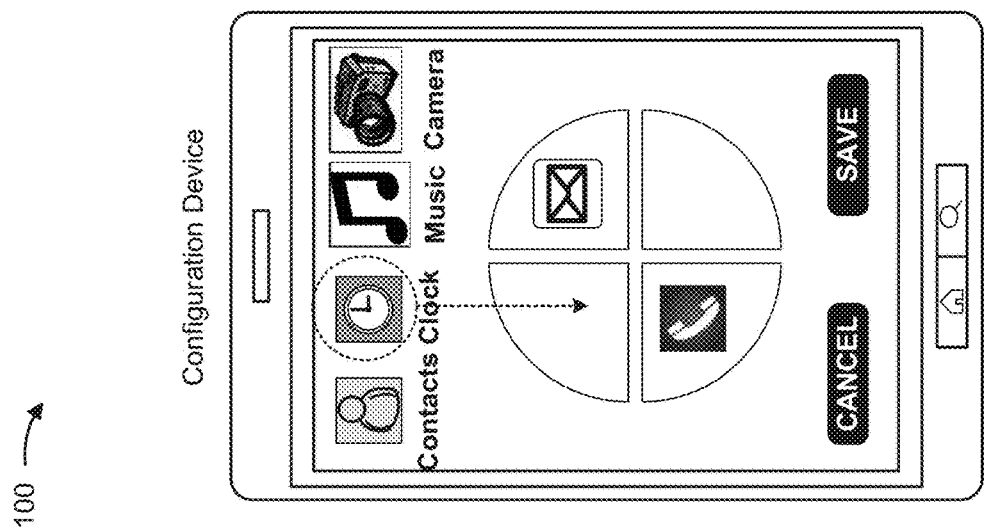

As shown in FIG. 1C, the configuration device may further receive a user configuration of the user interface layout. For example, as shown, the user may drag and release a third user interface element (e.g., an icon associated with a clock application) in association with a third quadrant, and may drag and release a fourth user interface element (e.g., an icon associated with a contacts application) in association with a fourth quadrant.

Figure 1D:
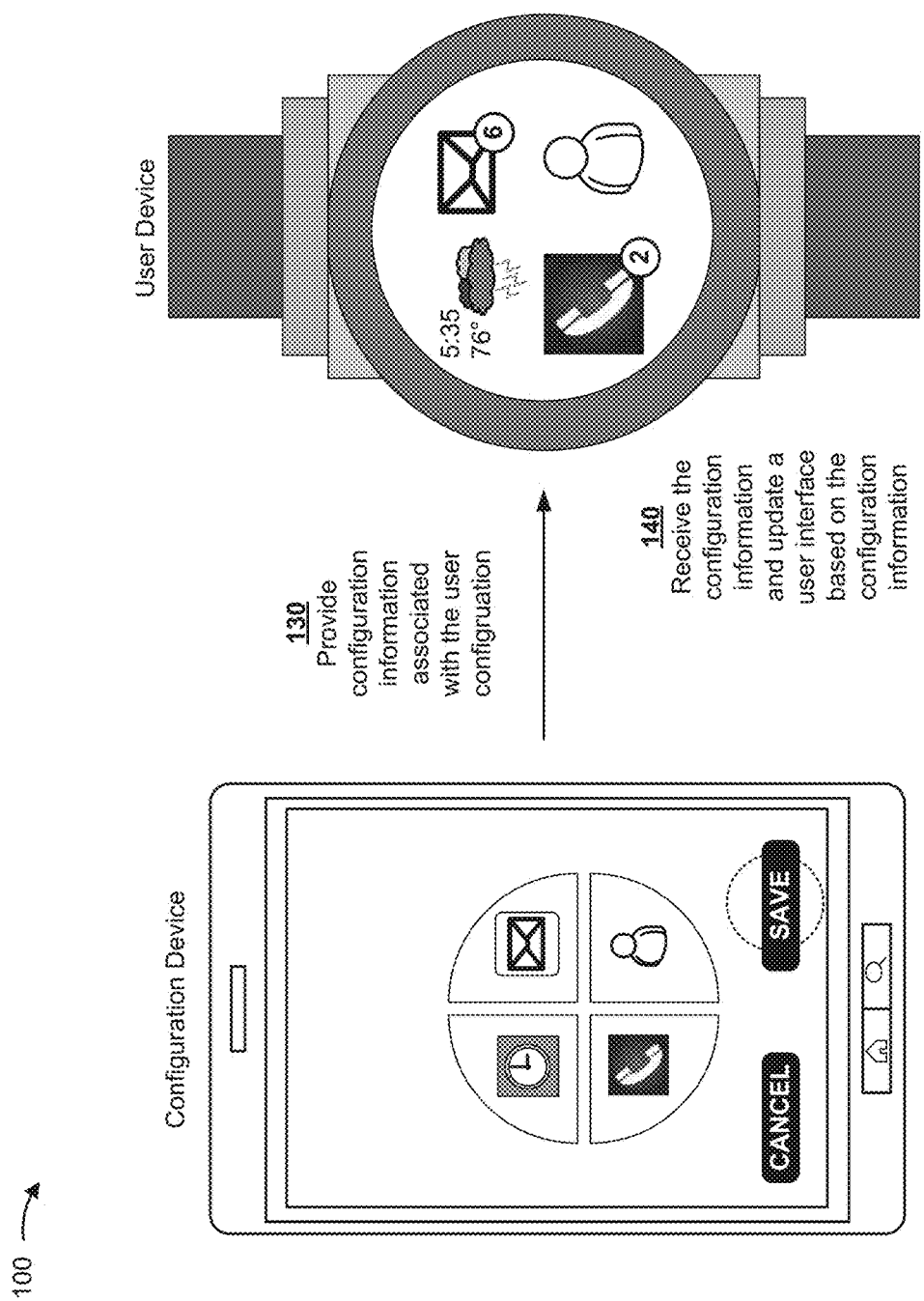

As shown in FIG. 1D, and by reference number 130, the configuration device may provide configuration information associated with the user configuration. For example, the configuration device may provide, to the user device, the configuration information based on a user interaction. As shown by reference number 140, the user device may receive the configuration information and may update a user interface based on the configuration information. For example, as shown, the user device may provide particular user interface elements (e.g., icons associated with a clock application, an email application, a phone application, and a contacts application) for display in a particular arrangement based on the user configuration. In this way, a user may configure a user interface layout of a user device via a configuration device.

Implementations described herein may enable a configuration device to receive a user configuration of a user interface layout of a user device, and provide configuration information to the user device. Implementations described herein may enable a user to configure a user interface layout on a configuration device that includes a larger screen than as compared to a user device. In this way, implementations described herein may reduce a quantity of errors and/or a quantity of time associated with configuring a user interface layout of a user device, thereby conserving processor and/or memory resources of the user device.

As indicated above, FIGS. 1A-1D are provided merely as an example. Other examples are possible and may differ from what was described with regard to FIGS. 1A-1D.

Figure 2:
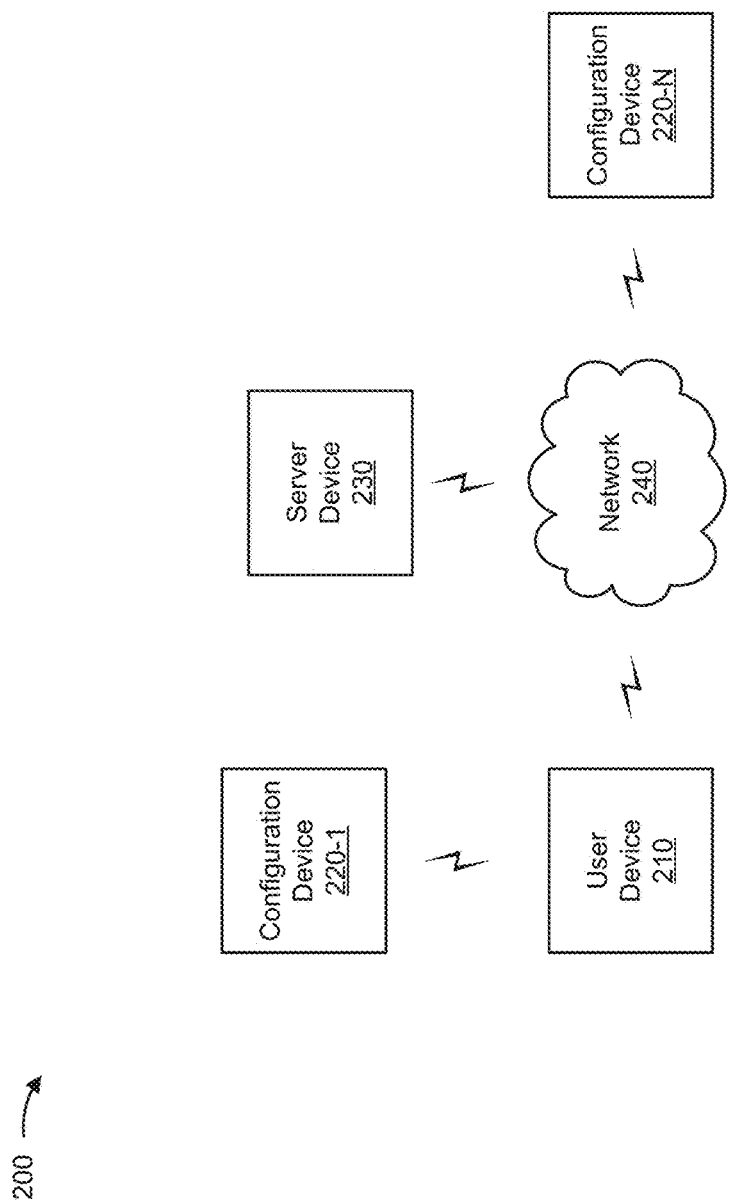
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more configuration devices 220-1 through 220-N (N≥1) (hereinafter referred to collectively as "configuration devices 220," and individually as "configuration device 220"), a server device 230, and a network 240. Devices of environment 200 may interconnect via wired connections, wireless connections, or a combination of wired and wireless connections.

User device 210 includes one or more devices capable of receiving, generating, storing, processing, and/or providing information associated with a user interface layout. For example, user device 210 may include a communication and/or computing device, such as a wearable communication device (e.g., a smart wristwatch, an activity band, or a pair of smart eyeglasses), a mobile phone (e.g., a smart phone or a radiotelephone, etc.), a laptop computer, a tablet computer, a handheld computer, a gaming device, or a similar type of device.

Configuration device 220 includes one or more devices capable of receiving, generating, storing, processing, and/or providing information associated with a configuration of a user interface layout. For example, configuration device 220 may include a communication and/or computing device, such as a wearable communication device (e.g., a smart wristwatch), a mobile phone (e.g., a smart phone or a radiotelephone, etc.), a laptop computer, a tablet computer, a handheld computer, a gaming device, a computer device (e.g., a personal computer), or a similar type of device.

Server device 230 includes one or more devices capable of receiving, generating, storing, processing, and/or providing information associated with a user account. For example, server device 230 may include a computing device, such as a server (e.g., a cloud server, a web server, a host server, and/or a database server), or the like. Server device 230 may provide, store, and/or provide access to information associated with a user account and/or a profile. In some implementations, server device 230 may store a profile associated with a user interface layout, and may provide configuration information associated with the profile to user device 210 and/or configuration device 220.

Network 240 includes one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
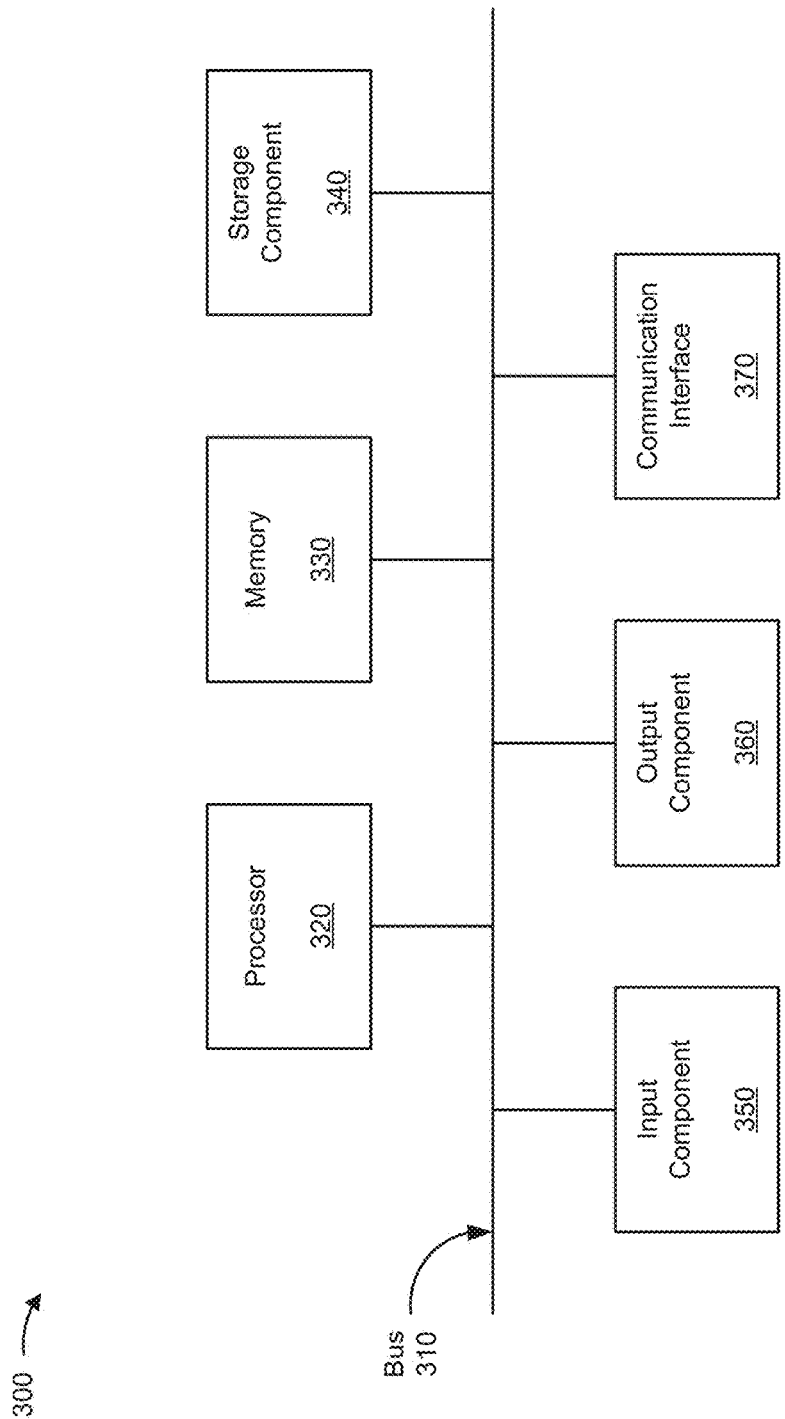
FIG. 3 is a diagram of example components of one or more devices of FIG. 2.

FIG. 3 is a diagram of example components of a device 300. Device 300 may correspond to user device 210, configuration device 220, and/or server device 230. In some implementations, user device 210, configuration device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
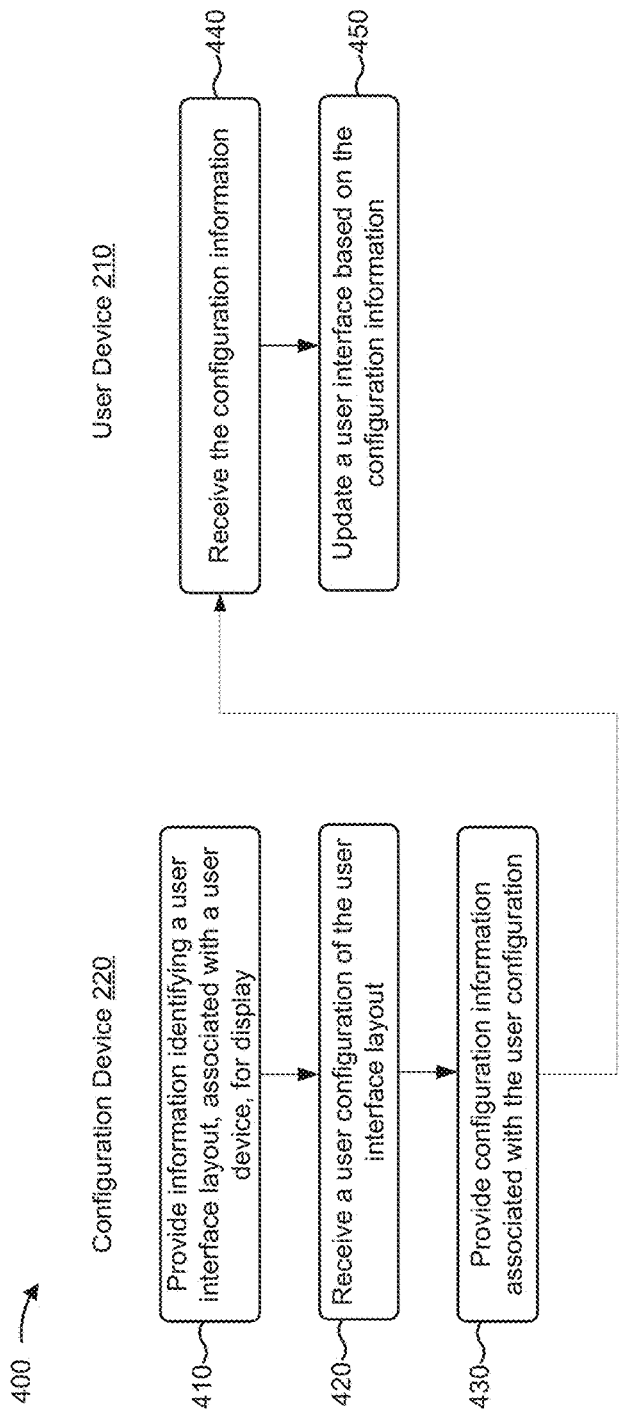
FIG. 4 is a flow chart of an example process for configuring a user interface layout of a user device via a configuration device.

FIG. 4 is a flow chart of an example process 400 for configuring a user interface layout of a user device via a configuration device. In some implementations, one or more process blocks of FIG. 4 may be performed by configuration device 220 and/or user device 210. In some implementations, one or more process blocks of FIG. 4 may be performed by another device or a group of devices separate from or including configuration device 220 and/or user device 210, such as server device 230.

As shown in FIG. 4, process 400 may include providing information identifying a user interface layout, associated with a user device, for display (block 410). For example, configuration device 220 may provide information identifying a user interface layout, associated with user device 210, for display. In some implementations, a user interface layout may represent an arrangement of one or more user interface elements (e.g., icons, badges, indicators, and/or objects) and/or may represent a characteristic associated with one or more user interface elements (e.g., a style, a color, and/or a design). For example, user device 210 may provide, for display, one or more user interface elements in a particular arrangement and/or in association with a particular characteristic based on a user interface layout.

In some implementations, configuration device 220 may provide information identifying a user interface layout, associated with user device 210, for display in association with an application (e.g., a native application and/or a web application). For example, configuration device 220 may execute and/or access an application that may enable configuration device 220 to configure a user interface layout associated with user device 210.

In some implementations, the application may be associated with a user account. Additionally, or alternatively, server device 230 may store information associated with a user account, and/or may provide information associated with a user account to user device 210 and/or configuration device 220. In some implementations, a user account may be associated with user device 210 and/or configuration device 220 based on a device identifier (e.g., a mobile device number (MDN) and/or a mobile equipment identifier (MEID)), a user account number, a user account name, or the like. In some implementations, a user account may store information identifying device information associated with user device 210, such as a device model, a device version, an operating system type (e.g., Android or iOS), an operating system version, a user interface type, a user interface version, a screen parameter (e.g., screen dimensions, a screen shape, and/or a screen size), a list of applications, an application version associated with the application being used to configure the user interface layout, or the like.

In some implementations, a user account may be associated with one or more profiles associated with user device 210. In some implementations, a profile may include information that identifies a user interface layout associated with user device 210. For example, a profile may include information that identifies a particular arrangement of user interface elements and/or particular characteristics associated with the user interface elements. Additionally, or alternatively, a profile may include information that identifies user interface layouts associated with multiple screens of user device 210 (e.g., a home screen, a settings screen, an ambient screen, and/or an active screen).

In some implementations, configuration device 220 may provide information identifying a user interface layout, associated with user device 210, for display based on a user selection (e.g., via configuration device 220) of a profile to configure. For example, a user may interact with configuration device 220 to select a profile to configure. In some implementations, a profile may include a profile that is currently associated with user device 210 (e.g., user device 210 may be displaying user interface elements in association with the profile). Alternatively, a profile may include a profile that may be potentially associated with user device 210 (e.g., user device 210 may display user interface elements in association with the profile).

In some implementations, configuration device 220 may identify a profile that is currently associated with user device 210. For example, configuration device 220 may receive, from server device 230 and/or user device 210, information that identifies a current profile associated with user device 210. Additionally, or alternatively, configuration device 220 may provide, for display, information that identifies user interface elements that are associated with the current profile. In this way, configuration device 220 may provide information for display (e.g., a preview) that represents a current user interface layout of user device 210. Additionally, in this way, a user may interact with configuration device 220 to configure the user interface layout of user device 210, as described elsewhere herein.

In some implementations, configuration device 220 may receive information that identifies a template associated with a user interface layout. For example, configuration device 220 may receive, from server device 230, one or more templates associated with one or more user interface layouts. In some implementations, a template may identify a particular arrangement of user interface elements, a particular characteristic associated with a user interface element, or the like. For example, a user may configure a user interface layout based on a template. In this way, configuration device 220 may receive templates from server device 230, and may allow a user to configure user interface layouts based on the templates.

In some implementations, configuration device 220 may provide one or more menus, check boxes, lists, or the like, that may allow a user to configure the user interface layout (e.g., select user interface elements to be included in the user interface layout, select characteristics of the user interface elements, or the like). Additionally, or alternatively, configuration device 220 may identify applications associated with user device 210, and may provide information that identifies the applications for display. For example, configuration device 220 may identify applications associated with user device 210 based on stored information (e.g., in a data structure) and/or based on receiving information from another device (e.g., user device 210 and/or server device 230). In this way, configuration device 220 may provide information identifying a user interface layout for display, which may enable a user to interact with configuration device 220 to configure the user interface layout, as described below.

As further shown in FIG. 4, process 400 may include receiving a user configuration of the user interface layout (block 420). For example, configuration device 220 may receive a user configuration of the user interface layout, associated with user device 210, based on a user interaction. In some implementations, a user interaction may include a touch gesture, such as a tap, a double-tap, a tap and hold, a nudge, a pinch, a spread, a slide, a drag, a flick, a swipe, or the like. For example, a user may interact with a touchscreen display of configuration device 220. Additionally, or alternatively, a user interaction may include a manipulation of the user interface layout via a peripheral device (e.g., a mouse or a stylus).

In some implementations, configuration device 220 may receive a user configuration of the user interface layout based on a user interaction with one or more user interface elements associated with the user interface layout. For example, a user may select particular user interface elements to be included in the user interface layout, may arrange the user interface elements, may adjust characteristics associated with the user interface elements (e.g., colors, fonts, and/or styles), or the like. In some implementations, configuration device 220 may detect a user interaction (e.g., a touch gesture and/or a combination of touch gestures) and may receive the user configuration information of the user interface layout based on detecting the touch gesture. In this way, a user may manipulate user interface elements, associated with the user interface layout, to configure the user interface layout.

In some implementations, the user interface layout may include one or more configurable areas. For example, the user interface layout may include a first configurable area, and a second configurable area that surrounds the first configurable area (e.g., the second configurable area may form a periphery around the first configurable area). In some implementations, configuration device 220 may receive a user configuration of the first configurable area and the second configurable area. For example, a user may configure the first configurable area and/or the second configurable area to include particular user interface elements, may configure characteristics associated with the user interface elements, or the like. For example, assume that a user configures the second configurable area to include user interface elements that correspond to time indicators (e.g., tick marks, or the like). In this case, the user may configure the quantity of time indicators that are displayed in association with the second configurable area, a style of the time indicators (e.g., numerals, ticks, or the like), or the like.

In some implementations, configuration device 220 may receive a user configuration of a button associated with user device 210. For example, a user may configure a functionality associated with a button of user device 210 (e.g., a mechanical button, a virtual button, or the like). In some implementations, configuration device 220 may receive a user configuration of a notification associated with user device 210. For example, a user may configure a location associated with a display screen of user device 210 where notifications are provided for display. For example, a user may configure a notification to be provided in association with the first configurable area and/or the second configurable area. Additionally, or alternatively, a user may configure a type of notification to be displayed via user device 210. For example, a user may configure particular notifications to be provided for display based on an application associated with the notification (e.g., a phone application, a messaging application, or the like). In this way, user device 210 may conserve processor resources by providing particular notifications based on a user configuration.

Additionally, or alternatively, a user may configure a duration associated with a notification (e.g., a quantity of time that the notification is provided for display). Additionally, or alternatively, a user may configure a characteristic associated with the notification (e.g., a visual and/or audible characteristic, such as a lighting effect, sound, or the like). For example, a user may configure the second configurable area to provide notifications by providing a lighting effect (e.g., a pulse lighting effect).

In some implementations, a user may configure a particular notification to be provided based on a detected orientation associated with user device 210. For example, a user may configure a particular notification (e.g., a visual notification) to be provided when user device 210 is associated with a first detected orientation (e.g., reflecting that the user is viewing the display screen), and/or may configure a particular notification (e.g., a vibration) to be provided when user device 210 is associated with a second detected orientation (e.g., reflecting that the user is not viewing the display screen). For example, a user may configure a type of notification, a characteristic associated with the notification, or the like, to be provided based on a detected orientation of user device 210. In this way, user device 210 may conserve processor resources by providing a particular notification for display based on a detected orientation of user device 210.

In some implementations, configuration device 220 may receive a user configuration of the user interface layout based on a selection of a profile. For example, assume that user device 210 is associated with a first profile. Further, assume that a user account associated with user device 210 is associated with multiple profiles. Additionally, assume that configuration device 220 receives input identifying a user selection of a second profile. In this case, configuration device 220 may provide, to user device 210, configuration information associated with the second profile, as described elsewhere herein. In this way, a user may select from multiple profiles associated with a user account, and configuration device 220 may provide configuration information to user device 210 (or multiple user devices 210) based on the selected user profile. In this way, user device 210 and/or configuration device may conserve processor and/or memory resources by reducing a quantity of processing time associated with configuring user profiles.

As further shown in FIG. 4, process 400 may include providing configuration information associated with the user configuration (block 430). For example, configuration device 220 may provide, to user device 210, configuration information associated with the user configuration of the user interface layout. In some implementations, configuration device 220 may provide the configuration information to user device 210 via a wireless connection, such as a wireless local area network (WLAN) connection, a personal area network (PAN) connection, or the like (e.g., via a Bluetooth connection or a near field communication (NFC) connection). For example, configuration device 220 may cause a wireless connection to be established with user device 210. Additionally, or alternatively, configuration device 220 may provide the configuration information to user device 210 via network 240. In some implementations, configuration information may include information that identifies a user configuration of a user interface layout, and/or may include information that may cause user device 210 to update a user interface (e.g., based on a user interface layout).

In some implementations, configuration device 220 may provide configuration information to user device 210 based on receiving information identifying the user configuration (e.g., in real-time). In this way, user device 210 may receive the user configuration and update a user interface layout as a user configures the user interface layout via configuration device 220. For example, a state change (e.g., based on receiving the user configuration) associated with configuration device 220 may be reflected simultaneously on user device 210. In this way, processor and/or memory resources of configuration device 220 and/or user device 210 may be conserved by reducing a quantity of processing time associated with a configuration. Additionally, or alternatively, configuration device 220 may provide configuration information to user device 210 based on a user input (e.g., identifying that the user is done configuring the user interface layout).

In some implementations, configuration device 220 may provide the configuration information to server device 230 (e.g., via network 240). Additionally, server device 230 may receive the configuration information and may update a profile associated with the user interface layout. Additionally, or alternatively, server device 230 may provide the user configuration to user device 210 (e.g., via network 240). Additionally, or alternatively, server device 230 may store information that identifies the user configuration of the user interface layout. In this way, server device 230 may provide configuration information, associated with a profile, to user device 210. Additionally, server device 230 may provide configuration information, associated with a particular profile, to one or more user devices 210. For example, assume that a user account is associated with multiple user devices 210. In this case, a user may select one or more user devices 210 to configure based on a profile or a set of profiles. Additionally, server device 230 may provide configuration information, associated with the profile, to the selected user devices 210. In this way, server device 230 may store configuration information and may provide the configuration information to user device 210, thereby reducing a quantity of time associated with configuring user device 210 and conserving processor and/or memory resources associated with configuration device 220 and/or user device 210.

In some implementations, configuration device 220 may provide the configuration information to user device 210 based on establishing a connection (e.g., an NFC connection, or the like). For example, configuration device 220 and user device 210 may be brought within communicative proximity (e.g., a threshold distance to establish an NFC connection). In some implementations, user device 210 may detect the connection, and may provide a prompt for display that allows a user to control whether user device 210 receives the configuration information. Additionally, or alternatively, user device 210 may receive the configuration information, and may provide a prompt for display that allows a user to accept a setting associated with the configuration information or revert to a previous setting associated with previous configuration information.

In some implementations, configuration device 220 may provide the configuration information to user device 210 based on establishing the connection and based on a quantity of time associated with the connection. For example, configuration device 220 may provide the configuration information to user device 210 based on configuration device 220 and user device 210 being within communicative proximity for a threshold quantity of time (e.g., thirty seconds, two minutes, five minutes, or the like). In some implementations, configuration device 220 (e.g., a first smart watch) may provide configuration information to user device 210 (e.g., a second smart watch). In this way, a user may bring a first smart watch within communicative proximity of a second smart watch, thereby enabling the first smart watch to provide configuration information to the second smart watch based on an NFC connection. In this way, user device 210 and/or configuration device 220 may conserve processor resources by reducing a quantity of steps (e.g., user interactions) associated with configuring user device 210.

As further shown in FIG. 4, process 400 may include receiving the configuration information (block 440), and updating a user interface based on the configuration information (block 450). For example, user device 210 may receive, from configuration device 220, the configuration information and may update a user interface of user device 210 based on the configuration information. In some implementations, user device 210 may receive, from configuration device 220, the configuration information based on a connection with configuration device 220 (e.g., based on a Bluetooth connection or an NFC connection).

In some implementations, user device 210 may receive the configuration information from server device 230. For example, configuration device 220 may provide the configuration information to server device 230 (e.g., via network 240), and/or server device 230 may store the configuration information (e.g., may update a profile associated with user device 210). Additionally, server device 230 may provide the configuration information to user device 210 and/or multiple user devices 210. In this way, server device 230 may provide the configuration information to multiple user devices 210, thereby conserving processor and/or memory resources of user devices 210 and/or configuration device 220 by obviating the need to independently configure each user device 210.

In some implementations, user device 210 may provide a preview for display based on receiving the configuration information. For example, the configuration information may include a preview associated with the configuration information (e.g., a preview of a user interface layout). Additionally, user device 210 may provide a prompt for display that allows a user to control whether user device 210 updates a user interface layout based on the configuration information. In this way, user device 210 may conserve processor and/or memory resources by not configuring the user interface layout in instances where the user is not satisfied with a user interface layout associated with the configuration information.

In some implementations, user device 210 may receive input identifying a selection of a profile. For example, user device 210 may access the user account associated with user device 210 and/or configuration device 220. Additionally, user device 210 may provide a list of profiles associated with the account. In this way, a user may select (e.g., via user device 210) a profile, and user device 210 may receive configuration information (e.g., from server device 230) associated with the profile. Additionally, in this way, user device 210 may update a user interface based on the configuration information associated with the profile. In this way, a user may select from multiple profiles and may configure a user interface layout via user device 210. In some implementations, user device 210 may receive configuration information associated with multiple configurations (e.g., profiles), and may update a profile based on a condition (e.g., a particular time of day, a location, or the like).

In some implementations, user device 210 may update a user interface based on the configuration information. In some implementations, user device 210 may receive the configuration information, may store the configuration information, and/or may implement the configuration information. For example, user device 210 may initiate a program to install the configuration information, and may install the configuration information. Additionally, or alternatively, the configuration information may permit and/or cause user device 210 to update a display based on the configuration information. For example, user device 210 may display particular user interface elements in association with particular characteristics and/or in association with a particular arrangement based on the user interface layout.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
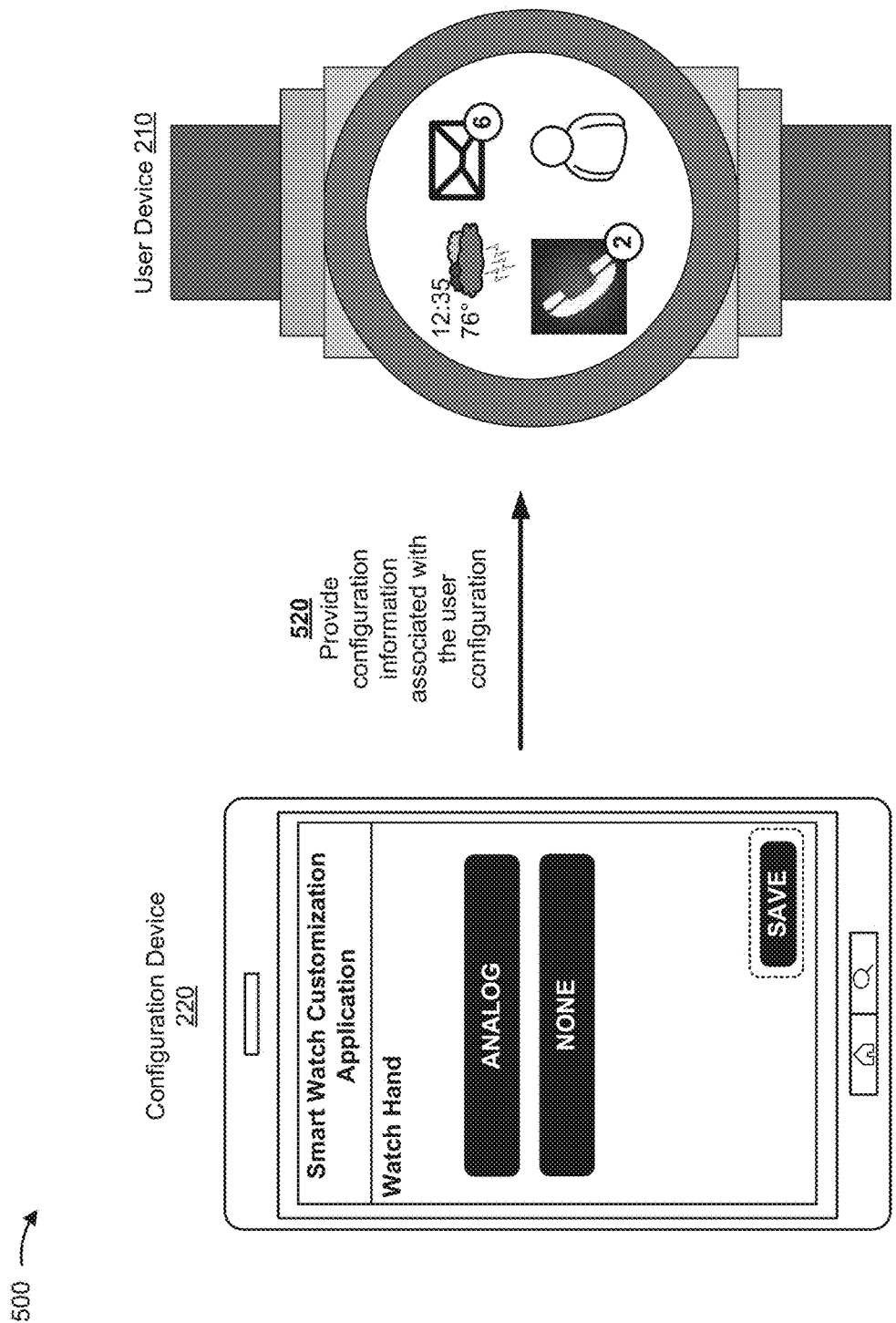
Figure 5C:
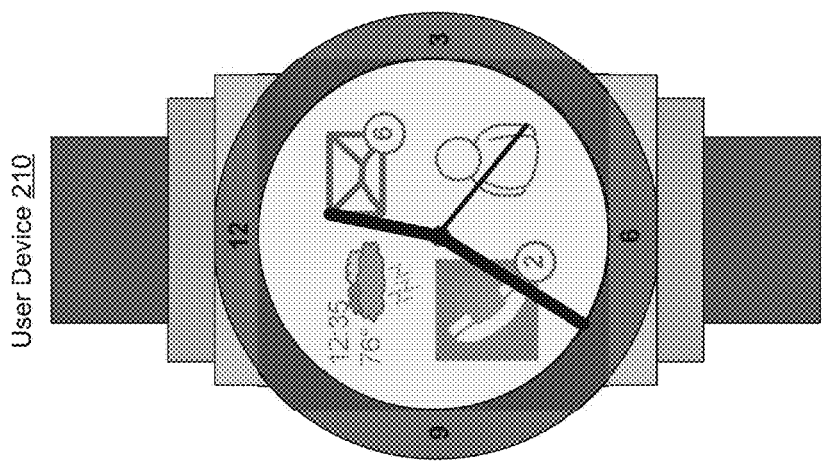
Figure 5C:
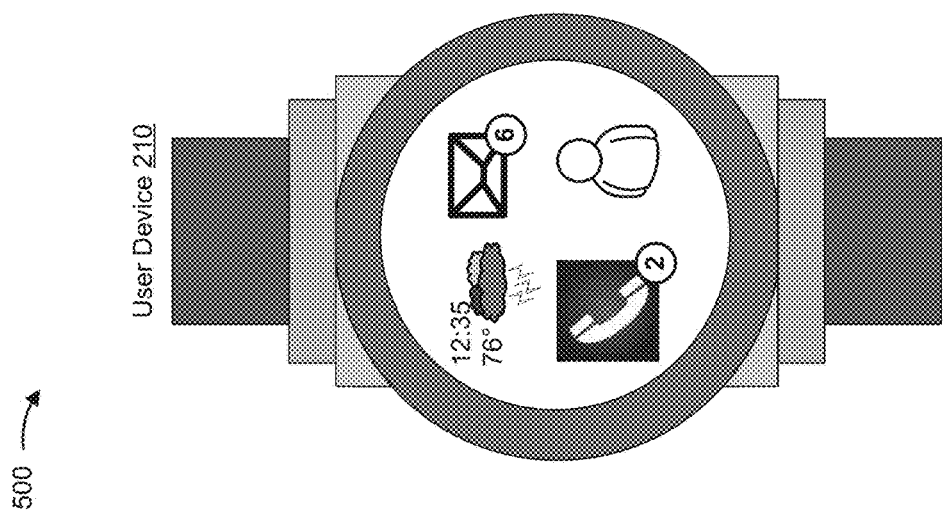

FIGS. 5A-5C are diagrams of an example implementation 500 relating to example process 400 shown in FIG. 4. FIGS. 5A-5C show an example of configuring a user interface layout of a user device via a configuration device.

As shown in FIG. 5A, and by reference number 510, configuration device 220 may receive a user configuration of a user interface layout. For example, as shown, assume that configuration device 220 provides a menu associated with particular user interface elements and/or characteristics associated with the user interface elements. As shown, assume that a user interacts with a menu item (e.g., "watch hand"). Further, as shown, assume that configuration device 220 provides a submenu that provides particular options (e.g., "analog" and "none") for display. Additionally, as shown, assume that a user selects a menu item (e.g., "analog") associated with the submenu.

As shown in FIG. 5B, and by reference number 520, configuration device 220 may provide configuration information associated with the user configuration. For example, as shown, configuration device 220 may provide the configuration information to user device 210. For example, assume that configuration device 220 is brought within communicative proximity of user device 210. In this case, configuration device 220 may establish a connection (e.g., an NFC connection) with user device 210 and may provide the configuration information to user device 210 based on establishing the connection.

As shown in FIG. 5C, and by reference number 530, user device 210 may receive the configuration information and may update a user interface based on the configuration information. For example, as shown, user device 210 may display user interface elements associated with analog watch hands based on the configuration information.

As indicated above, FIGS. 5A-5C are provided merely as an example. Other examples are possible and may differ from what was described with regard to FIGS. 5A-5C.

Implementations described herein may enable a user to configure a user interface layout of a user device via a configuration device. In this way, a user may configure a user interface layout of a user device using another device that includes a larger display. Additionally, implementations described herein may enable a user device to adjust a user interface layout based on configuration information received from a configuration device. Implementations described herein may obviate a need to download files associated with user interface layouts. In this way, processor and/or memory resources of the user device may be conserved, and network resources may be conserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        provide information identifying a user interface layout and one or more user interface elements, associated with a smart watch, for display,
            the user interface layout including a first configurable area and a second configurable area;
        receive information identifying a template associated with the first configurable area of the user interface layout;
        receive a user configuration of the first configurable area of the user interface layout based on a user interaction that arranges the one or more user interface elements, displayed in an area outside the template, into one or more quadrants of the template,
            the one or more user interface elements being one or more icons that are released into the one or more quadrants of the template;
        receive a user configuration of the second configurable area of the user interface layout,
            the second configurable area overlaying the first configurable area, and
            the second configurable area including a user interface element, of the one or more user interface elements, that corresponds to a time indication; and
        provide, to the smart watch, configuration information associated with the user configuration of the first configurable area and the user configuration of the second configurable area to permit the smart watch to update a user interface based on the configuration information,
            the device being different from the smart watch.

2. The device of claim 1, where the one or more processors are further to:
    cause a near field communication (NFC) connection to be established with the smart watch; and
    where the one or more processors, when providing, to the smart watch, the configuration information associated with the user configuration of the first configurable area and the user configuration of the second configurable area, are to:
        provide the configuration information associated with the user configuration based on causing the NFC connection to be established with the smart watch.

3. The device of claim 1, where the one or more processors are further to:
    receive information identifying a user account associated with the smart watch; and
    where the one or more processors, when providing the information identifying the user interface layout, are to:
        provide the information identifying the user interface layout based on receiving the information identifying the user account.

4. The device of claim 1, where the one or more processors are further to:
    provide the configuration information to a server device, the server device being associated with a user account of the smart watch.

5. The device of claim 1, where the one or more processors are further to:
    execute an application that enables configuration of the user interface layout; and
    where the one or more processors, when providing the information identifying the user interface layout, associated with the smart watch, are to:
        provide the information identifying the user interface layout based on executing the application.

6. The device of claim 1, where the device is a wearable user device.

7. A non-transitory computer-readable medium storing instructions, the instructions comprising:
    one or more instructions that, when executed by one or more processors of a device, cause the one or more processors to:
        provide information identifying a user interface layout and one or more user interface elements, associated with a smart watch, for display,
            the user interface layout including a first configurable area and a second configurable area;
        receive information identifying a template associated with the first configurable area of the user interface layout;
        receive a user configuration of the first configurable area of the user interface layout based on a user interaction that arranges the one or more user interface elements, displayed in an area outside the template, into one or more quadrants of the template,
            the one or more user interface elements being one or more icons that are released into the one or more quadrants of the template;
        receive a user configuration of the second configurable area of the user interface layout,
            the second configurable area overlaying the first configurable area, and
            the second configurable area including a user interface element, of the one or more user interface elements, that corresponds to a time indication; and
        provide, to the smart watch, configuration information associated with the user configuration of the first configurable area and the user configuration of the second configurable area to enable the smart watch to provide a user interface based on the configuration information,
            the device being different from the smart watch.

8. The non-transitory computer-readable medium of claim 7, where the one or more instructions, when executed by the one or more processors, further cause the one or more processors to:
- identify one or more applications associated with the smart watch; and
- where the one or more instructions, which cause the one or more processors to provide information identifying the user interface layout, cause the one or more processors to:
  - provide information identifying the user interface layout based on identifying the one or more applications associated with the smart watch.

9. The non-transitory computer-readable medium of claim 7, where the one or more instructions, when executed by the one or more processors, further cause the one or more processors to:
- receive information that identifies a user selection of a profile,
  - the profile being associated with the user interface layout; and
- where the one or more instructions, which cause the one or more processors to provide the information identifying the user interface layout, cause the one or more processors to:
  - provide the information identifying the user interface layout based on receiving the information that identifies the user selection of the profile.

10. The non-transitory computer-readable medium of claim 7, where the smart watch is a first smart watch,
- where the one or more instructions, when executed by the one or more processors, further cause the one or more processors to:
  - provide the configuration information to a second smart watch to enable the second smart watch to provide a user interface based on the configuration information,
    - the second smart watch being different from the first smart watch.

11. The non-transitory computer-readable medium of claim 7, where the one or more instructions, when executed by the one or more processors, further cause the one or more processors to:
- receive information identifying the user interface layout from another device; and
- where the one or more instructions, which cause the one or more processors to provide the information identifying the user interface layout, cause the one or more processors to:
  - provide the information identifying the user interface layout based on receiving the information identifying the user interface layout from the other device.

12. A method, comprising:
- providing, by a device, information identifying a user interface layout and one or more user interface elements, associated with a smart watch, for display,
  - the user interface layout including first configurable area and a second configurable area;
- receiving, by the device, information identifying a template associated with the first configurable area of the user interface layout;
- receiving, by the device, a user configuration of the first configurable area of the user interface layout based on a user interaction that arranges the one or more user interface elements, displayed in an area outside the template, into one or more quadrants of the template, the one or more user interface elements being one or more icons that are released into the one or more quadrants of the template;
- receiving, by the device, a user configuration of the second configurable area of the user interface layout,
  - the second configurable area overlaying the first configurable area, and
  - the second configurable area including a user interface element, of the one or more user interface elements, that corresponds to a time indication; and
- providing, by the device and to the smart watch, configuration information based on the user configuration of the first configurable area and the user configuration of the second configurable area to cause the smart watch to update a user interface of the smart watch based on the configuration information,
  - the smart watch being different from the device.

13. The method of claim 12, further comprising:
- causing a near field communication (NFC) connection to be established with the smart watch; and
- where providing the information identifying the user interface layout comprises:
  - providing the information identifying the user interface layout based on causing the NFC connection to be established with the smart watch.

14. The method of claim 12, further comprising:
- receiving information identifying one or more profiles associated with the smart watch; and
- where providing the information identifying the user interface layout comprises:
  - providing the information identifying the user interface layout based on receiving the information identifying the one or more profiles associated with the smart watch.

15. The method of claim 12, further comprising:
- providing the configuration information to another device,
  - the other device being associated with a user account of the smart watch.

16. The method of claim 12, further comprising:
- detecting a touch gesture; and
- where receiving the user configuration of the first configurable area and the user configuration of the second configurable area of the user interface layout comprises:
  - receiving the information identifying the user interface layout based on detecting the touch gesture.

17. The device of claim 1, where the one or more processors are further to:
- detect a touch gesture; and
- where the one or more processors, when receiving the user configuration of the first configurable area and the user configuration of the second configurable area of the user interface layout, are to:
  - receive the information identifying the user interface layout based on detecting the touch gesture.

18. The non-transitory computer-readable medium of claim 7, where the one or more instructions, when executed by the one or more processors, further cause the one or more processors to:
- detect a touch gesture; and
- where the one or more instructions, that cause the one or more processors to receive the user configuration of the first configurable area and the user configuration of the second configurable area of the user interface layout, cause the one or more processors to:
  - receive the information the user interface layout based on detecting the touch gesture.

19. The non-transitory computer-readable medium of claim 7, where the one or more instructions, when executed by the one or more processors, further cause the one or more processors to:
  cause a near field communication (NFC) connection to be established with the smart watch; and
  the one or more instructions, that cause the one or more processors to provide, to the smart watch, the configuration information associated with the user configuration of the first configurable area and the user configuration of the second configurable area, cause the one or more processors to:
    provide the configuration information based on causing the NFC connection to be established with the smart watch.

20. The method of claim 12, further comprising:
providing the configuration information to a server device,
  the server device being associated with a user account of the smart watch.

* * * * *